United States Patent [19]

Inagaki et al.

[11] Patent Number: 5,227,495
[45] Date of Patent: Jul. 13, 1993

[54] CYANINE COMPOUND HAVING A HETERO RING CONTAINING AN IMIDAZOLE NUCLEUS FUSED TO A NAPHTHOQUINONE NUCLEUS

[75] Inventors: Yoshio Inagaki, Kanagawa; Masao Yabe, Shizuoka, both of Japan

[73] Assignee: Fuji Photo Film Co., Ltd., Kanagawa, Japan

[21] Appl. No.: 639,442

[22] Filed: Jan. 10, 1991

[30] Foreign Application Priority Data

Jan. 12, 1990 [JP] Japan ..................................... 2-4915
Mar. 5, 1990 [JP] Japan ..................................... 2-53333

[51] Int. Cl.$^5$ .................... C07D 235/20; C09B 23/04; C09B 23/06; C09B 23/08; G03C 1/18
[52] U.S. Cl. ......................... 548/302.1; 430/170; 430/281; 430/343; 430/496; 430/522; 430/914; 430/920
[58] Field of Search ......................... 548/336

[56] References Cited

U.S. PATENT DOCUMENTS 2,951,841  9/1960  Wilson .......................... 548/336 X
3,268,522  8/1966  Schenck ......................... 548/336 X
3,725,398  4/1973  Webster et al. .................. 548/336 X
4,902,604  2/1990  Yamaguchi et al. ............... 548/336 X

FOREIGN PATENT DOCUMENTS 61-294429  12/1986  Japan ............................. 548/336
1131890    12/1984  U.S.S.R. ......................... 548/336

OTHER PUBLICATIONS

Stetsenko et al I, Chemical Abstracts, vol. 58, 6818a–g (1963).
Stetsenko et al II, Chemical Abstracts, vol. 62, 11942f–11943e (1965).
Stetsenko et al III, Chemical Abstracts, vol. 71, #22892k (1969).

Primary Examiner—Floyd D. Higel
Attorney, Agent, or Firm—Sughrue, Mion, Zinn, Macpeak & Seas

[57] ABSTRACT

A cyanine compound of the following formula:

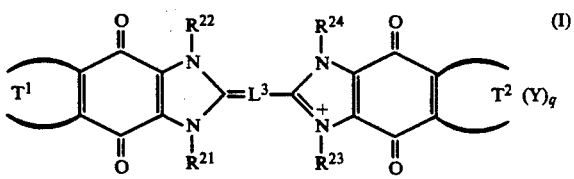

wherein $T^1$ and $T^2$ each independently represents an atomic group which is necessary for forming a condensed benzene ring; $L^3$ represents a methine group or a trivalent connecting group formed by conjugated double bonding of 3, 5 or 7 methine groups; $R^{21}$, $R^{22}$, $R^{23}$ and $R^{24}$ each independently represents an alkyl group having 1 to 12 carbon atoms or a phenyl group both of which may or may not be substituted; Y is an anion and q is a number which is necessary for neutralizing a positive charge; provided that at least one of $R^{21}$, $R^{22}$, $R^{23}$ and $R^{24}$ is an alkyl group having 3 or more carbon atoms and which may or may not be substituted when $L^3$ consists of 1, 3 or 5 methine groups.

The cyanine compound can be used as a coloring material, a sensitizing dye for photographic use, a recording dye for use in optical information recording media, a staining agent, a pharmaceutical agent, and the like. Further, the cyanine dye can be used in an optical filter and in an optical information recording medium.

2 Claims, 1 Drawing Sheet

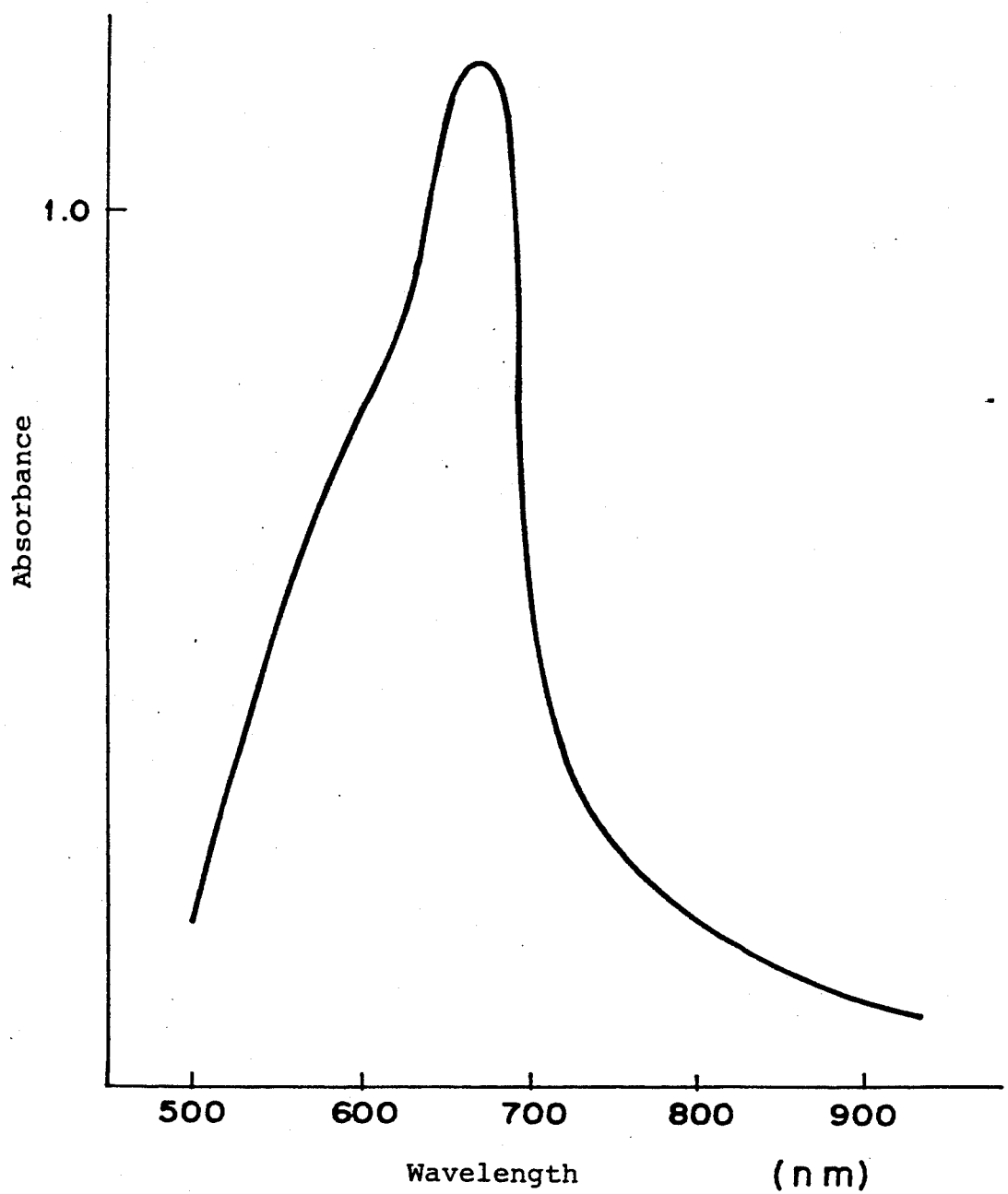
FIGURE

CYANINE COMPOUND HAVING A HETERO RING CONTAINING AN IMIDAZOLE NUCLEUS FUSED TO A NAPHTHOQUINONE NUCLEUS

BACKGROUND OF THE INVENTION

The present invention relates to a novel cyanine compound which can be used as, for example, a coloring material, a sensitization dye for photographic use, a recording dye for use in optical information recording media, a staining agent of biological samples such as cells, a pharmaceutical agent and the like. The present invention also relates to an optical filter that uses the cyanine compound as a coloring material, and to an optical information recording medium such as an optical disc that uses the novel cyanine compound.

Cyanine dyes having a hetero ring as the terminal group in which a naphthoquinone nucleus and an imidazole nucleus are fused are disclosed for example in *Chemical Abstracts*, vol. 71, 22892K, *Chemical Abstracts*, vol. 62, p. 11942, and *Chemical Abstracts*, vol. 58, p. 6818. These prior art dyes, however, are not versatile, because the structures of the substituent groups or conjugated methine chains are limited.

SUMMARY OF THE INVENTION

In view of the above, it is an object of the present invention to provide a novel cyanine compound having hetero ring structures of specific naphthoquinone and imidazole nuclei and having various substituent groups so that they are suitable for a variety of applications.

Another object of the present invention is to provide an optical filter containing the novel cyanine compound as a coloring material and having excellent performance, and an optical information recording medium, such as an optical disc, containing the novel cyanine compound and having a remarkably high reflectivity without reducing its C/N value.

Other objects and advantages of the present invention will be made apparent below.

To achieve the above objects, the present invention provides a cyanine compound represented by the following general formula (I):

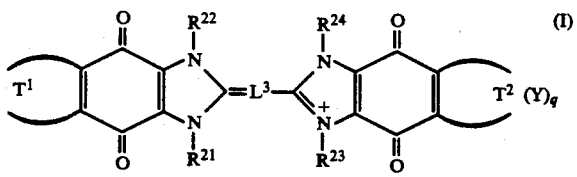

wherein $T^1$ and $T^2$ each independently represents an atomic group which is necessary for forming a condensed benzene ring; $L^3$ represents a methine group or a trivalent connecting group formed by conjugated double bonding of 3, 5 or 7 methine groups; $R^{21}$, $R^{22}$, $R^{23}$ and $R^{24}$ each independently represents an alkyl group having 1 to 12 carbon atoms or a phenyl group both of which may or may not be substituted; Y is an anion and q is a number which is necessary for neutralizing a positive charge; provided that at least one of $R^{21}$, $R^{22}$, $R^{23}$ and $R^{24}$ is an alkyl group having 3 or more carbon atoms and which may or may not be substituted when $L^3$ consists of 1, 3 or 5 methine groups.

BRIEF DESCRIPTION OF THE DRAWING

The sole figure of the drawing is a curve showing wavelength dependent changes in the absorbance of an optical filter.

DETAILED DESCRIPTION OF THE INVENTION

The aforementioned problems involved in the prior art were solved by the invention of a cyanine compound as represented by the following formula (I):

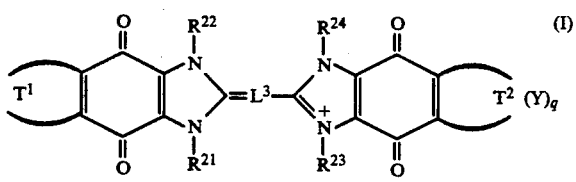

wherein $T^1$ and $T^2$ each independently represents an atomic group that is necessary for forming a condensed benzene ring; $L^3$ represents a methine group or a trivalent connecting group formed by conjugated double bonding of 3, 5 or 7 methine groups (for example, a conjugated trimethine group, a conjugated pentamethine group or a conjugated heptamethine group); $R^{21}$, $R^{22}$, $R^{23}$ and $R^{24}$ each independently represents an alkyl group having 1 to 12 carbon atoms or a phenyl group both of which may or may not be substituted; Y is an anion and q is a number which is necessary for neutralizing a positive charge; provided that at least one of $R^{21}$, $R^{22}$, $R^{23}$ and $R^{24}$ is an alkyl group having 3 or more carbon atoms and which may or may not be substituted when $L^3$ consists of 1, 3 or 5 methine groups.

Of the compounds of general formula (I), a compound represented by the following general formula (II) is more preferable in view of easy synthesis.

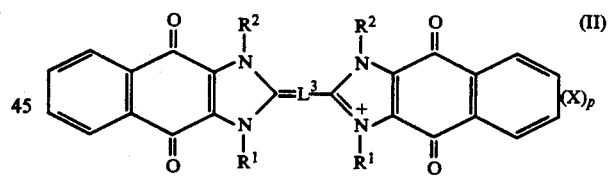

wherein X is an ion selected from the group consisting of $Cl^-$, $Br^-$, $I^-$, $ClO_4^-$, $H_2PO_4^-$, $HSO_4^-$, $HPO_4^{2-}$, $PO_4^{3-}$, $SO_4^{2-}$, $CH_3SO_3^-$, paratoluenesulfonate, $BF_4^-$, $PF_6^-$, $SbF_6^-$, perfluoroalkanesulfonic acid ion,

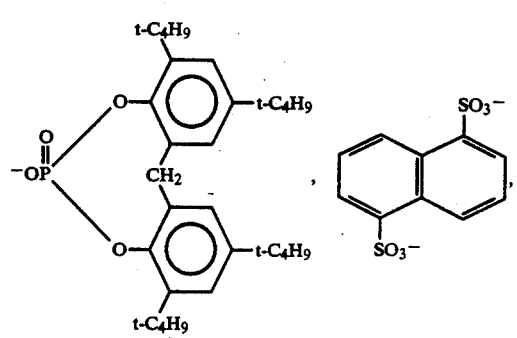

and monovalent or divalent carboxylate ions (for example,

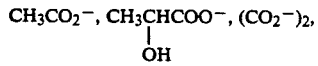 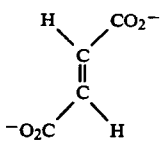

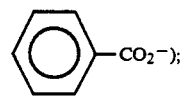

$R^1$ is an alkyl group having 3 or more carbon atoms; $R^2$ is an alkyl group having 1 to 18 carbon atoms or a phenyl group both of which may or may not be substituted; and $L^3$ is the same group as $L^3$ in general formula (I).

Examples of compounds represented by general formula (I) of the present invention are listed below by way of illustration and not by way of limitation.

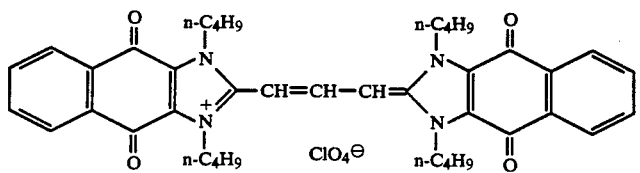

I-1

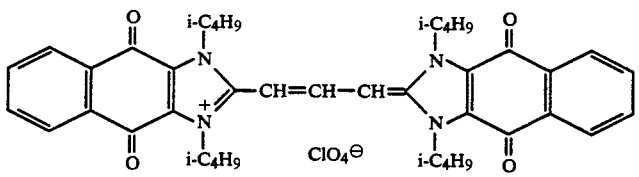

I-2

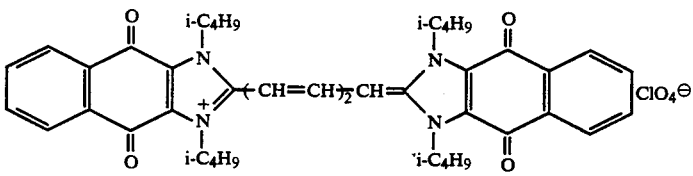

I-3

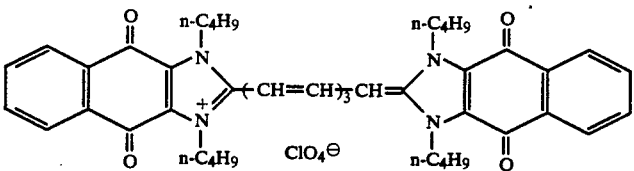

I-4

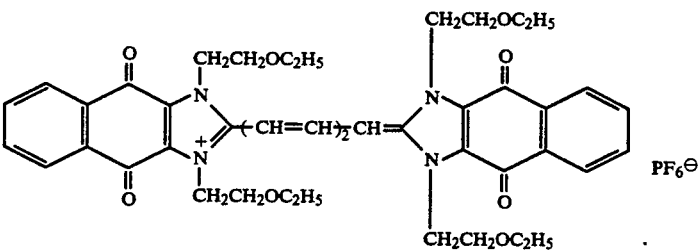

I-5

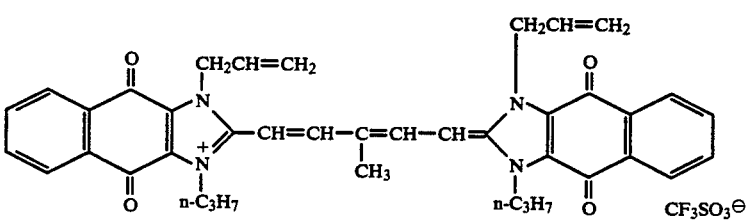

I-6

-continued
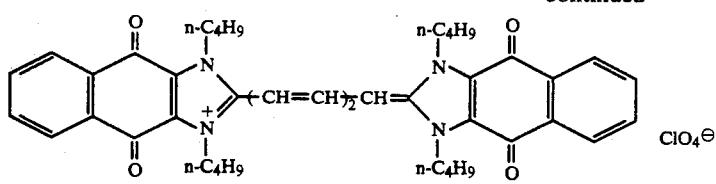 I-7
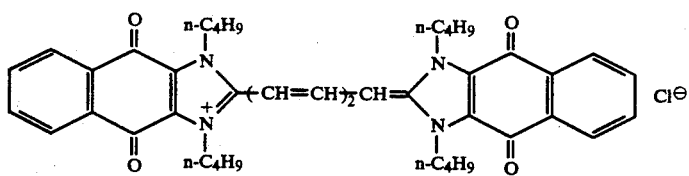 I-8
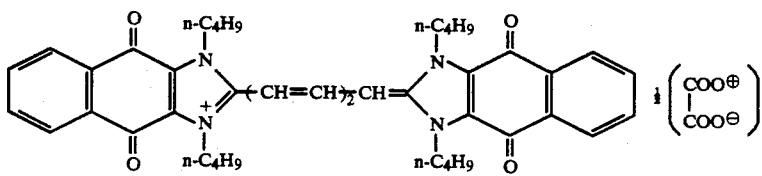 I-9
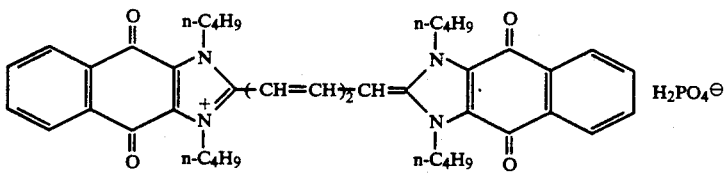 I-10
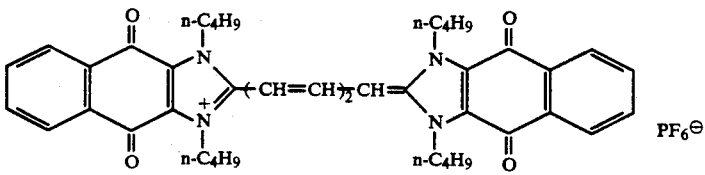 I-11
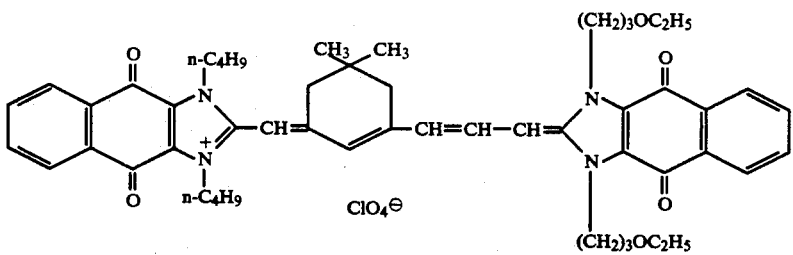 I-12
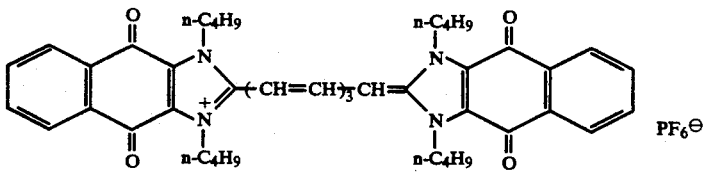 I-13
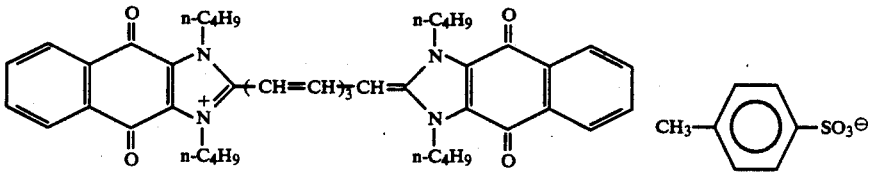 I-14

-continued
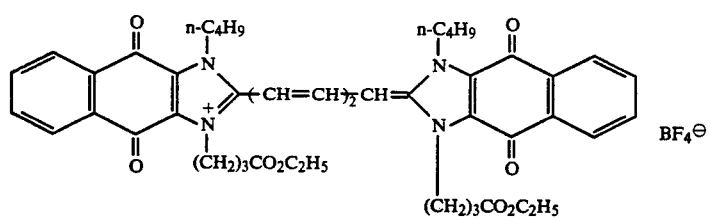 I-15
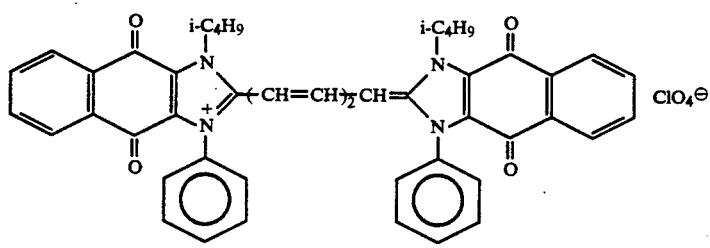 I-16
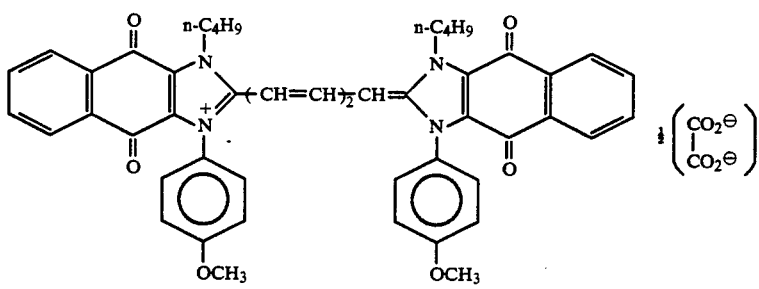 I-17
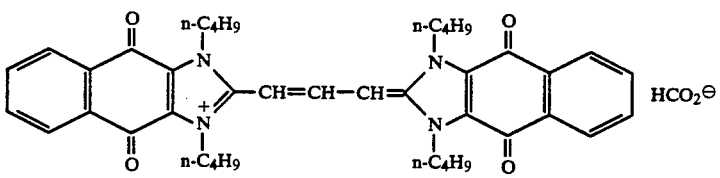 I-18
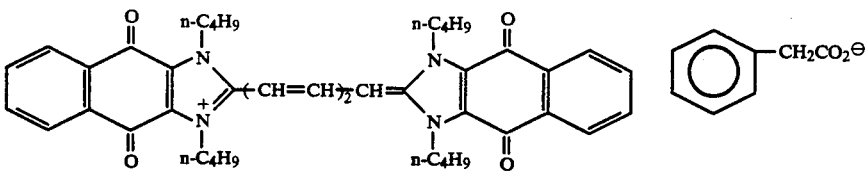 I-19
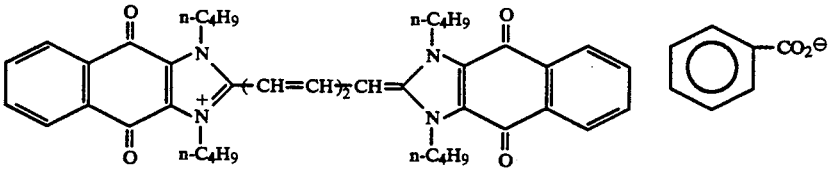 I-20
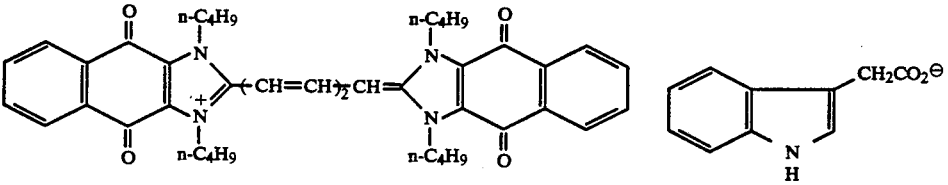 I-21

-continued
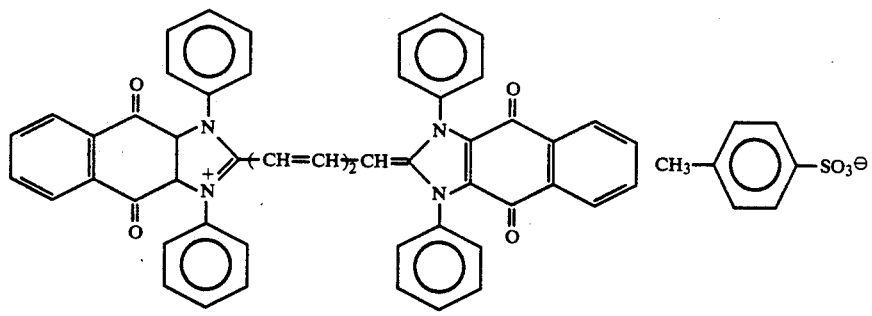
I-22
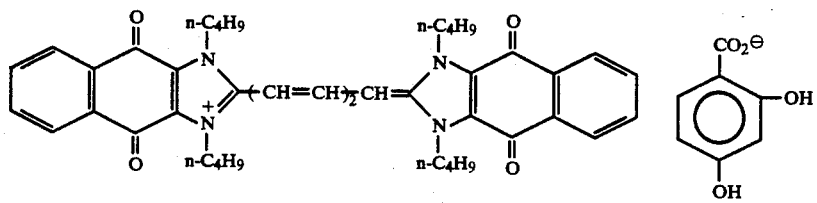
I-23
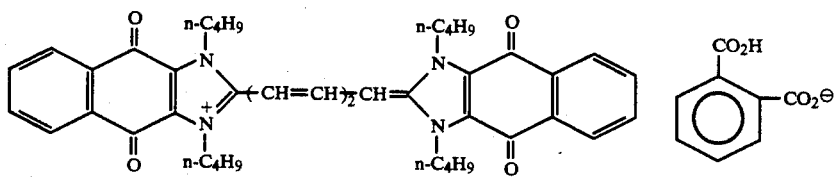
I-24
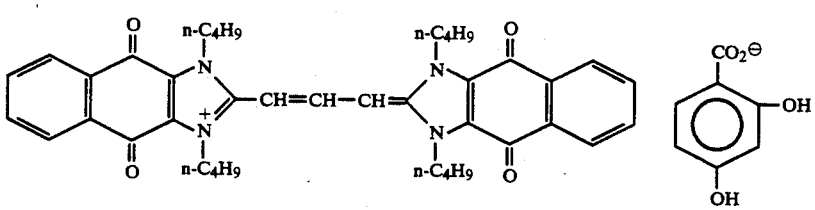
I-25
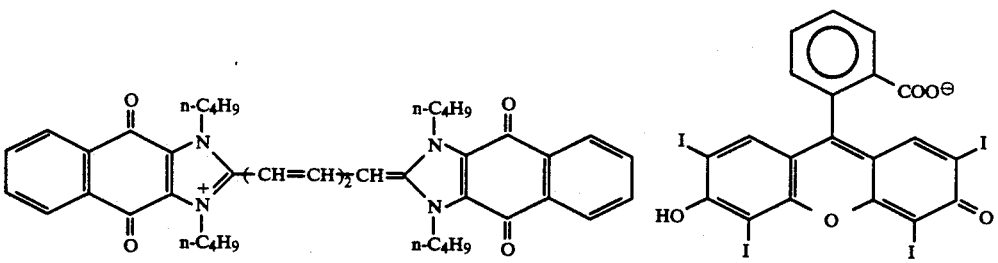
I-26
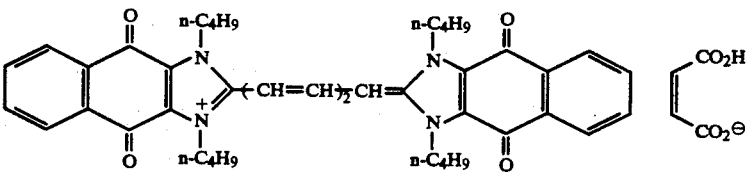
I-27
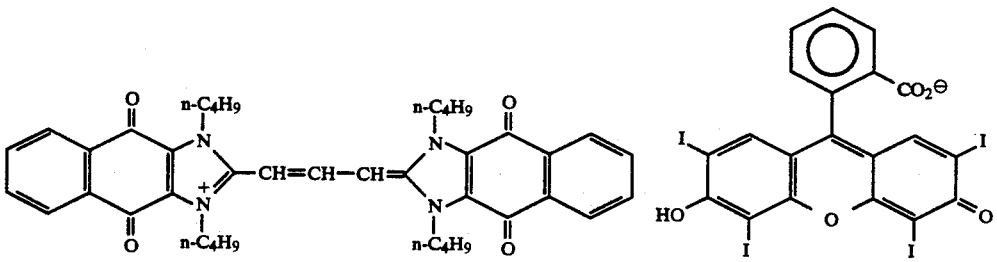
I-28

-continued
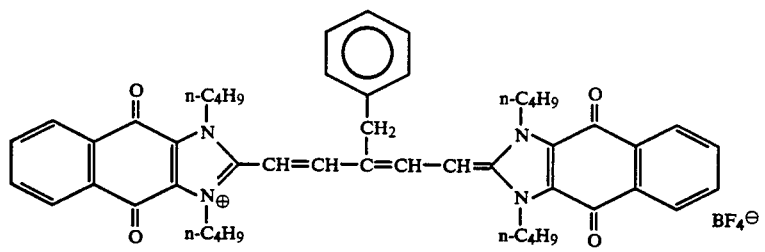 I-29
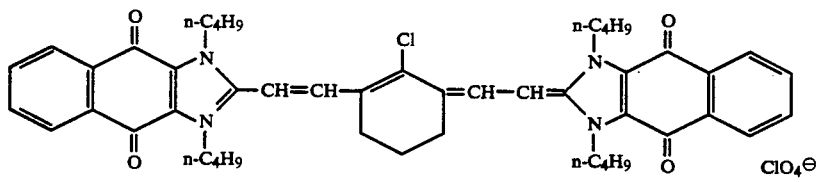 I-30
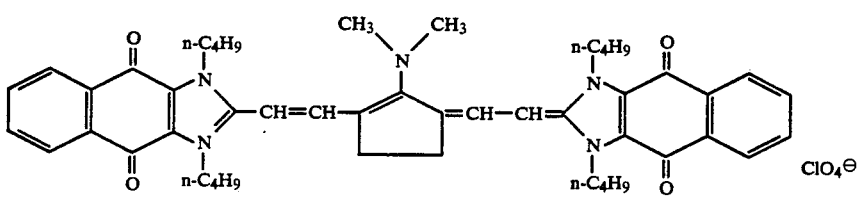 I-31
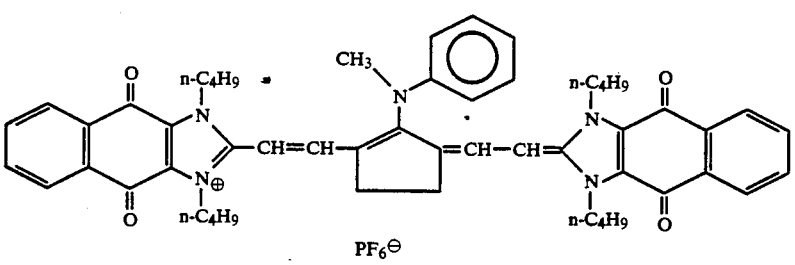 I-32
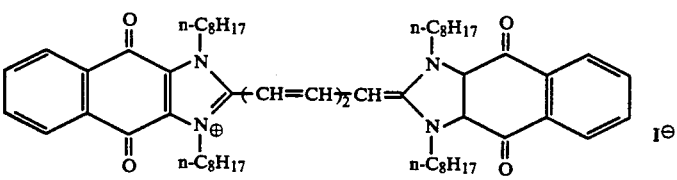 I-33
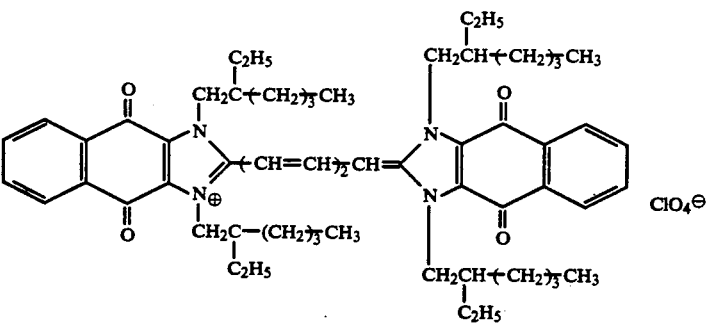 I-34
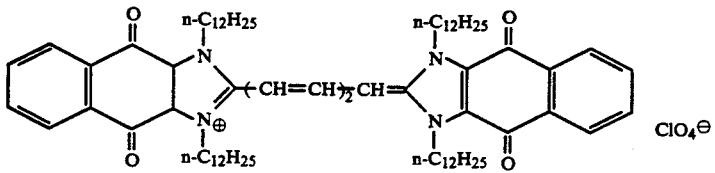 I-35

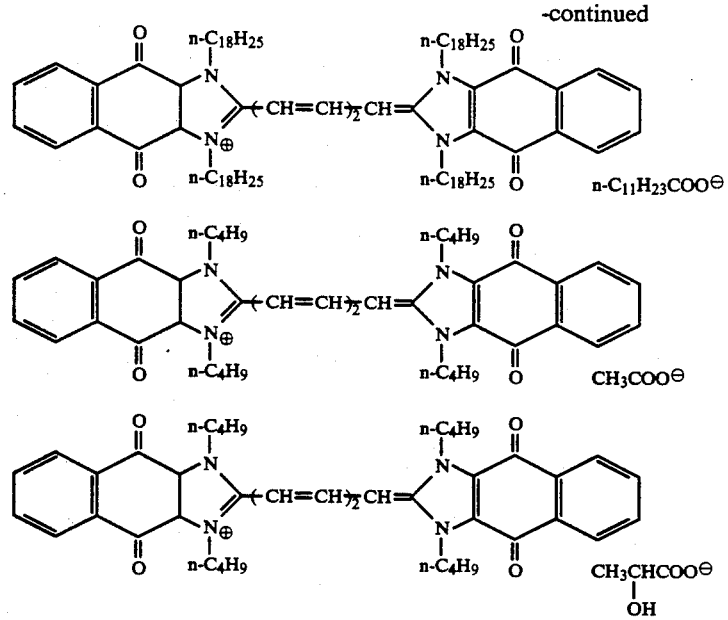

I-36

I-37

I-38

The compounds represented by general formula (I) of the present invention can be synthesized in accordance with the generally used methods for the synthesis of cyanine dyes as disclosed, for example, in *Chemical Abstracts*, vol. 71, 22892k (Aug. 11, 1969).

Next, the application of the cyanine compound of the present invention to obtain optical information recording medium is described.

In the recording medium of the present invention, the compound represented by general formula (I) may be used alone or in combination with other compounds, such as other cyanine dyes, phthalocyanine dyes, pyrylium and thiopyrylium dyes, azulenium dyes, squalilium dyes, complex metal salt dyes such as Ni and Cr, naphthoquinone and anthraquinone dyes, indophenol dyes, indoaniline dyes, triphenylmethane dyes, triallylmethane dyes, aminium and diimmonium dyes, nitroso compounds and the like.

For the purpose of improving light fastness, it is preferable to use, jointly with the compounds of the general formula (I), various dyes known as singlet oxygen quenchers such as the following compounds represented by general formula (III) or (IV):

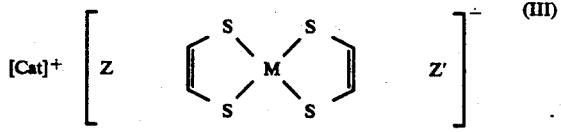

wherein [Cat]+ is a non-metal cation such as tetraalkylammonium; M is a transition metal atom such as Ni; and Z and Z' are atomic groups which are necessary for completing 5- or 6-membered aromatic or hetero rings such as a benzene ring or a 2-thioxo-1,3-dithiol ring each being substituted or unsubstituted;

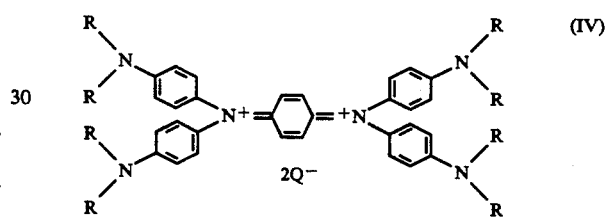

wherein R is an alkyl group which may or may not have a substituent group, and Q is the same anion as X in the general formula (II), above. Singlet oxygen quenchers, represented by the above general formula (III) or (IV), include PA-1006 (Mitsui Toatsu Fain Co., Ltd.), IRG-023 (Nippon Kayaku Co., Ltd.) and the like.

For the formation of a recording layer, a coating solution is prepared by dissolving one of the cyanine compounds of formula (I) of the present invention and, if necessary, one of the above quenchers, a binding agent and the like in an appropriate solvent. The coating solution is then applied to the surface of a base board to form a layer and then dried.

Illustrative examples of solvents to be used for the preparation of the coating solution for the dye recording layer of the present invention include: esters such as ethyl acetate, butyl acetate and cellosolve acetate; ketones such as methyl ethyl ketone, cyclohexanone and methyl isobutyl ketone; chlorinated hydrocarbons such as dichloromethane, 1,2-dichloroethane and chloroform; amides such as dimethylformamide; hydrocarbons such as cyclohexane; ethers such as tetrahydrofuran, ethyl ether and dioxane; alcohols such as ethanol, n-propanol, isopropanol and n-butanol; fluorine solvents such as 2,2,3,3-tetrafluoropropanol; and the like.

If necessary, various additives such as an oxidation inhibitor, a UV absorbent, a plasticizer, a lubricant and the like may be added to the coating solution.

Illustrative examples of binding agents which can be used in the present invention include: natural high molecular weight organic materials (molecular weight: $2 \times 10^3$ to $5 \times 10^6$) such as gelatin, cellulose derivatives, dextran, rosin, rubber and the like; and synthesized high molecular weight organic materials (molecular weight: $2 \times 10^3$ to $5 \times 10^6$) such as hydrocarbon resins including polyethylene, polypropylene, polystyrene, polyisobutylene and the like, vinyl resins including polyvinyl chloride, polyvinylidene chloride, copolymers of polyvinyl chloride and polyvinyl acetate and the like, acryl resins including poly(methyl acrylate), poly(methyl methacrylate) and the like, and initial condensed materials of thermosetting resins including a polyvinyl alcohol, a chlorinated polyethylene, an epoxy resin, a butyral resin, a rubber derivative, a phenol-formaldehyde resin and the like.

When a binding agent is included in the recording layer of the present invention, the amount of the cyanine dye may generally be from 0.01 to 99% by weight, preferably from 1.0 to 95% by weight, based on the weight of the binding agent. Concentration of the dye in the coating solution thus prepared may generally be from 0.01 to 10% by weight, preferably from 0.1 to 5% by weight.

The recording layer may be made into a single layer or multiple layers, but the thickness of the total layer may generally be from 200 to 3,000Å, preferably from 500 to 2,500Å. In addition, the recording layer may be coated not only on one side of a base board but also on both sides.

With regard to the coating method, any generally used method, such as spray coating, spin coating, dip coating, roller coating, blade coating, doctor rolling, screen printing and the like, may be used.

In accordance with the information recording medium of the present invention, a reflecting layer may preferably be coated on the aforementioned recording layer, for the purpose of improving C/N and reflectivity during the regeneration of information. The term "C/N" as used herein means a "carrier to noise ratio", and namely a ratio of intensity of information signal to intensity of noise. The larger the C/N is, the smaller the noise is. The C/N is preferably 50 dB or more.

Light reflecting substances which can be used as the reflecting material of the reflecting layer may have a high reflectivity against a laser beam. Illustrative examples of these substances include: metals and metalloids such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, Bi and the like; and stainless steel. Preferably, the light reflecting substance is selected from Cr, Ni, Pt, Cu, Ag, Au, Al and stainless steel. These substances may be used alone or as a mixture or as an alloy of two or more.

Formation of a reflecting layer on the recording layer may be carried out, for example, by means of evaporation, sputtering or ion plating of the above light reflecting substances. The thickness of the reflecting layer may generally be from 100 to 3,000Å.

A protecting layer may be further coated on the reflecting layer for the purpose of physically and chemically protecting the recording layer. Such a protecting layer may also be coated on the back side of a base board, a side on which the recording layer is not coated, in order to improve flaw resistance and moisture resistance.

Illustrative examples of materials to be used in the protecting layer include inorganic materials such as SiO, $SiO_2$, $MgF_2$, $SnO_2$, $Si_3N_4$ and the like and organic materials such as a thermoplastic resin, a thermosetting resin, a UV-setting resin and the like.

A protecting layer may be formed on a recording layer, a silver salt layer, a reflecting layer, and/or on a base board by laminating, through an adhesion layer, a film prepared by means of extrusion of a plastic material. Such a protecting layer may also be formed by means of vacuum evaporation, sputtering, coating and the like.

When the protecting layer material is a thermoplastic resin or a thermosetting resin, a protecting layer may also be formed by dissolving the material in an appropriate solvent and coating and drying the thus prepared coating solution on a substrate. In the case of a UV-setting resin, a protecting layer may also be formed on a substrate by applying the resin as it is or as a coating solution prepared by dissolving the resin into an appropriate solvent and thereafter exposing the solution to UV rays to harden the coated resin. If necessary, various additives, such as an antistatic agent, an oxidation inhibitor, a UV absorbent and the like, may further be added to these coating solutions. The thickness of the protecting layer thus formed may generally be from 0.1 to 100 μm.

In accordance with the present invention, the information recording medium may be in the form of a single board having the foregoing construction of layers, but a lamination type information recording medium may also be prepared by sticking two boards having the above layer construction together with an adhesive agent or the like in such a manner that the recording layers of the two boards face each other inside the resulting laminated medium. In addition, an information recording medium of an air sandwich type may also be prepared by using two disc-shaped base boards, at least one of which has the aforementioned layer construction, and by sticking them together with an inner spacer ring and an outer spacer ring.

Examples of the present invention are given below by way of illustration and not by way of limitation.

First, synthesis of some of the above Compounds I-1 to I-38 of the general formula (I) are described.

EXAMPLE 1

Synthesis of Compound I-2

To 4 ml of pyridine were added 0.23 g of 1,3-diisobutyl-2-methylbenzo[2,3-d]imidazolium 4-methylbenzenesulfonate and 1 ml of ethyl orthoformate, and the thus prepared mixture was subjected to reflux with heating for 6.5 hours. After distilling off the solvent under a reduced pressure, 3 ml of methanol were added to the remaining reaction mixture, followed by addition of 0.3 g of tetrabutylammonium perchlorate which had been dissolved in 3 ml of methanol. Thereafter, the thus precipitated crystal particles were collected by filtration and washed with methanol to obtain blue-green crystals of Compound I-2 with a yield of 86 mg (λmax in methanol=502 nm).

EXAMPLE 2

Synthesis of Compound I-3

In 4 ml of N,N'-dimethylformamide were dissolved 0.9 g of 1,3-diisobutyl-2-methylbenzo[2,3-d]imidazolium 4-methylbenzenesulfonate and 180 mg of 1,5-diaza-1,5-diphenyl-1,3-pentadiene, followed by the subsequent addition of 0.18 ml of acetic anhydride and 0.27 ml of 1,8-diazabicyclo[5,4,0]-7-undecene. After stirring the thus prepared mixture at room temperature for 2 hours, the reaction solution was poured in 150 ml of water and the resulting precipitated solids were collected by filtration and washed with water. The solid particles thus collected were dissolved in 20 ml of methanol and the resulting solution was mixed with 1 g of tetrabutylammonium perchlorate which had been dissolved in 2 ml of methanol. Thereafter, the thus precipitated crystal particles were collected by filtration and washed with methanol to obtain green crystals of Compound I-3 with a yield of 210 mg (melting point or decomposition point, 225° to 226° C.; and λmax in methanol, 600 nm).

EXAMPLE 3

Synthesis of Compound I-7

In 30 ml of N,N'-dimethylformamide were dissolved 5 g of 1,3-dibutyl-2-methylbenzo[2,3-d]imidazolium 4-methylbenzenesulfonate and 1.1 g of 1,5-diaza-1,5-diphenyl-1,3-pentadiene, followed by the subsequent addition of 1 ml of acetic anhydride and 2.2 ml of 1,8-diazabicyclo[5,4,0]-7-undecene. After stirring the thus prepared mixture at room temperature for 2 hours, the reaction solution was poured in 150 ml of a methanol solution of 5 g tetrabutylammonium perchlorate. The resulting precipitated solids were collected by filtration and washed with methanol to obtain yellow-green metallic luster crystals of Compound I-7 with a yield of 0.5 g (meltin9 point or decomposition point, 215° to 216° C.; and λmax in methanol, 596 nm).

Examples 4 and 5 describe the use of the cyanine compound of formula (I) of the present invention as coloring materials in optical filters.

EXAMPLE 4

Optical filters were prepared by forming an optical filter composition using Compound I-2 obtained in Example 1 in the following manner. Components of the composition as shown below by weight parts were mixed and thoroughly stirred. After subjecting the mixture to filtration, the resulting optical filter composition was applied to a metallic supporting substrate by means of flow coating, and the thus formed layer was peeled off to obtain an optical filter. In this way, several optical filters having different dry layer thicknesses of from 0.02 to 0.3 mm were obtained. An optical filter (25 μm in dry thickness) thus obtained absorbed light at about 500 to 750 nm.

| An example of the composition | |
| --- | --- |
| TAC (cellulose triacetate) | 170 parts by weight |
| TPP (triphenyl phosphate) | 10 parts by weight |
| Methylene chloride | 800 parts by weight |
| Methanol | 160 parts by weight |
| Compound I-2 | 0.4 part by weight |

EXAMPLE 5

A solution of a composition including Compound I-7 synthesized in Example 3, as shown below by weight parts, was coated on a PMMA (polymethyl methacrylate) supporting substrate by means of spin coating at 1000 rpm.

| Composition | |
| --- | --- |
| Dichloroethane | 100 parts by weight |
| Compound I-7 | 1 part by weight |

Optical density of an optical filter having a smooth surface is shown in the Figure.

As is evident from the Figure, a smooth-surfaced optical filter which absorbs light at about 500 to 750 nm can be obtained by using Compound I-7 of the present invention.

COMPARATIVE EXAMPLE 1

Attempts were made to obtain an optical filter by repeating the procedure of Example 5, except that Compound I-7 was replaced with the following comparative compound disclosed in *Chemical Abstracts*, vol. 58, p. 6818.

Comparative compound

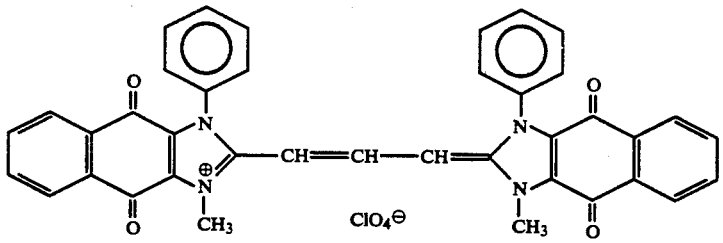

Useful optical filters were not obtained because their surfaces were rough instead of smooth. The amorphous layer of the dye used as the comparative compound was apt to be crystallized because of a low degree of freedom of the conformation of the dye molecule, since the number of carbon atoms in the alkyl group connected to the nitrogen atom of the comparative compound was smaller than that of the compound of the present invention (only one carbon atom in the case of the comparative compound).

EXAMPLE 6

In 100 ml of 2,2,3,3-tetrafluoropropanol (structural formula, $HCF_2CF_2CH_2OH$) were dissolved 1.6 g of the following dye A and 0.4 g of Compound I-7 represented by the general formula (I) to obtain a coating solution for use in the preparation of a dye layer.

Dye A

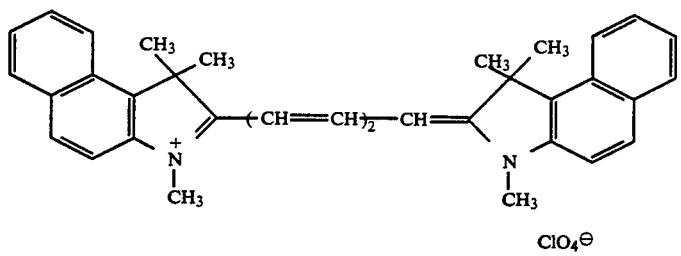

The thus obtained coating solution was applied by means of spin coating at a revolving speed of 1,000 rpm to the surface of a disc-shaped polycarbonate base board equipped with a tracking guide (outside diameter, 120 mm; inside diameter, 15 mm; thickness, 1.2 mm; track pitch, 1.6 μm; groove width, 0.5 μm; groove depth, 900Å). The thus applied solution was dried for 30 seconds to form a recording layer of 1,300Å in thickness.

On the surface of the thus formed recording layer was further formed a reflecting layer of 1,300Å in thickness by means of DC sputtering of Au.

To the surface of the thus formed reflecting layer was further applied a UV-setting resin (Trade name, 3070; manufactured by Three Bond Co., Ltd.) by means of spin coating at a revolving speed of 1500 rpm and the coated resin was exposed to UV rays using a high pressure mercury lamp to harden the resin and thereby to form a protecting layer of 3 μm in thickness.

In this manner, an information recording medium which comprises a base board, a recording layer, a reflecting layer and a protecting layer was obtained.

EXAMPLE 7

An information recording medium was constructed by repeating the process of Example 6, except that the coating solution for use in the formation of the dye layer was prepared by further adding to it 0.2 g of the following Compound C (IRG-023, manufactured by Nippon Kayaku Co., Ltd.) as a quencher.

Compound C (diimmonium compound)

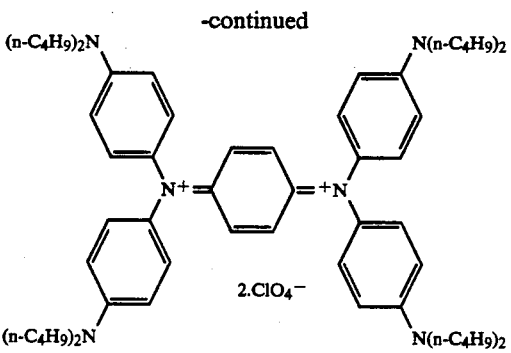

EXAMPLE 8

An information recording medium was constructed by repeating the process of Example 6, except that a base board with its groove depth of 1,600Å was used instead of the board with a 900Å groove depth, the amount of the dye A was changed from 1.6 g to 1.0 g, the amount of Compound I-7 represented by the foregoing general formula (I) was changed from 0.4 g to 1.0 g, the coating solution for use in the formation of the dye layer was prepared by further adding 0.2 g of the above Compound C (IRG-023, manufactured by Nippon Kayaku Co., Ltd.) as a quencher and the thickness of the recording layer was changed from 1,300Å to 2,000Å.

EXAMPLE 9

An information recording medium was constructed by repeating the process of Example 8, except that dye A was replaced with the following dye B.

Dye B

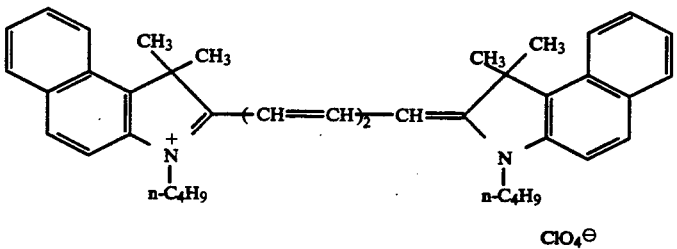

COMPARATIVE EXAMPLE 2

An information recording medium was constructed by repeating the process of Example 6, except that the amount of dye A was changed from 1.6 g to 2.0 g and the coating solution for use in the formation of a dye layer was prepared without using Compound I-7 represented by the general formula (I).

COMPARATIVE EXAMPLE 3

An information recording medium was constructed by repeating the process of Comparative Example 2, except that the coating solution for use in the formation of the dye layer was prepared by further adding 0.4 g of the above Compound C (IRG-023, manufactured by Nippon Kayaku Co., Ltd.) as a quencher.

Compositions of the coating solutions prepared for use in the formation of dye layers in Examples 6 to 9 and Comparative Examples 2 and 3 are shown in Table 1.

TABLE 1

| | Materials (parts by weight) dye/quencher |
|---|---|
| Example 6 | dye A (80)/I-7 (20)/— |
| Example 7 | dye A (80)/I-7 (20)/IRG-023 (10) |
| Example 8 | dye A (50)/I-7 (50)/IRG-023 (10) |
| Example 9 | dye B (50)/I-7 (50)/IRG-023 (10) |
| Comparative Example 2 | dye A (100)/—/— |
| Comparative Example 3 | dye A (100)/—/IRG-023 (20) |

Below is an evaluation of the information recording media.

1. Reflectivity

The reflectivity of unrecorded portions of the information recording media prepared above was measured by irradiating each recording medium from its base board side with light at a wavelength of 780 nm using a spectrophotometer (manufactured by Hitachi, Ltd.).

2. C/N

Signals at a modulation frequency of 720 kHz (33% duty) of each of the information recording media prepared above were recorded using a semiconductor laser beam at a wavelength of 780 nm (constant linear velocity, 1.3 m/sec.; recording power, 7.0 mW). The signals thus recorded were regenerated at a regeneration power of 0.5 mW and the C/N at the time of the regeneration was measured using a spectrum analyzer (TR 4135, manufactured by Advantest Co., Ltd.).

Results of the measurements of the reflectivities and C/N values are shown in Table 2.

TABLE 2

| | Reflectivity (%) | C/N (dB) |
|---|---|---|
| Example 6 | 81 | 50 |
| Example 7 | 80 | 50 |
| Example 8 | 83 | 50 |
| Example 9 | 84 | 50 |
| Comparative Example 2 | 73 | 50 |
| Comparative Example 3 | 69 | 50 |

As is evident from Table 2, each of the optical discs having the recording layer which comprises a specified cyanine dye of the present invention and one additional cyanine dye (Examples 6 to 9) has a remarkably high reflectivity with its C/N value being kept at a high level. Moreover, as the results of Examples 7, 8 and 9 indicate, the reflectivity can be maintained at a high level even when a quencher is used for the purpose of improving light fastness.

On the other hand, the recording layer of the optical disc prepared in Comparative Example 2 comprises only one dye which has a benzoindolenine nucleus. Though such a dye is generally known as a compound having a high reflectivity, the optical disc prepared using this dye had a low reflectivity compared to Examples 6 to 9. Such a low reflectivity may result in insufficient regeneration of information by a CD player. Because of such a low effect of the use of the one comparative dye, the reflectivity decreased to lower than 70% when a quencher was jointly used (Comparative Example 3).

Thus, it is apparent that there has been provided, in accordance with the present invention, novel cyanine compounds having specified hetero ring structures which can be applied, for example, to a coloring material for use in optical filters, a recording dye for use in optical information recording media and the like.

While the invention has been described in detail and with reference to specific embodiments thereof, it will be apparent to one skilled in the art that various changes and modifications can be made therein without departing from the spirit and scope thereof.

What is claimed is:

1. A cyanine compound represented by the following formula:

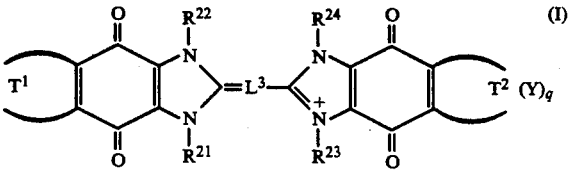

wherein $T^1$ and $T^2$ each independently represents a group of atoms necessary for forming a condensed benzene ring; $L^3$ represents 1, 3, 5 or 7 methine groups; $R^{21}$, $R^{22}$, $R^{23}$ and $R^{24}$ each independently represents an alkyl having 1 to 12 carbon atoms or a phenyl; Y is an anion, and q is a number which is necessary for neutralizing a positive charge; provided that when $L^3$ consists of 1, 3 or 5 methine groups, at least one of $R^{21}$, $R^{22}$, $R^{23}$ and $R^{24}$ is an alkyl having 3 or more carbon atoms.

2. A cyanine compound represented by the following formula

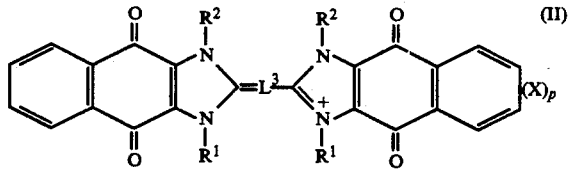

wherein X is an ion selected from the group consisting of $Cl^-$, $Br^-$, $I^-$, $ClO_4^-$, $H_2PO_4^-$, $HSO_4^-$, $HPO_4^{2-}$, $PO_4^{3-}$, $SO_4^{2-}$, $CH_3SO_3^-$, paratoluenesulfonate, $BF_4^-$, $PF_6^-$, $SbF_6^-$, perfluoroalkanesulfonic acid ion,

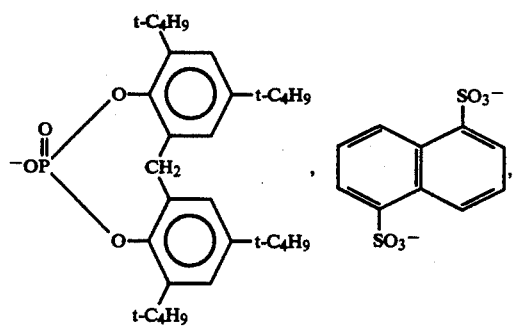

a monobasic carboxylate ion and a divalent carboxylate ion; $R^1$ is an alkyl having 3 or more carbon atoms; $R^2$ is an alkyl having 1 to 18 carbon atoms or a phenyl and $L^3$ is 1, 3, 5 or 7 methine groups.

* * * * *